Sept. 9, 1969        D. R. BROWN                3,465,403
    METHOD OF ESTABLISHING A TESTING PROCEDURE
           FOR SELF-HEALING CAPACITORS
              Filed Dec. 28, 1965

INVENTOR
D.R. BROWN
BY
ATTORNEY 3,465,403
METHOD OF ESTABLISHING A TESTING PROCE-
   DURE FOR SELF-HEALING CAPACITORS
Donald R. Brown, Downers Grove, Ill., assignor to
   Western Electric Company, Incorporated, New
   York, N.Y., a corporation of New York
      Filed Dec. 28, 1965, Ser. No. 516,877
         Int. Cl. H01g 13/00; B23q 17/00
U.S. Cl. 29—25.42                           5 Claims

ABSTRACT OF THE DISCLOSURE

The subject method relates to establishing a testing procedure after the winding of self-healing capacitors so as to determine which of such capacitors should be fully fabricated. Initially, the internal resistance of each of a plurality of self-healing capacitors is measured after the winding thereof so as to determine a representative resistance value. The test capacitors are thereafter subjected to further fabricating operations, at least to the point where the ends of the capacitors are solder sprayed. Each of the plurality of capacitors is then subjected to a high voltage breakdown test so as to determine a representative number of breakdowns therein. The representative internal resistance value and the representative number of breakdowns in the plurality of tested capacitors are then correlated so as to establish a relationship therebetween. A value of internal resistance is thereafter selected above which the established relationship shows that the fully fabricated capacitors have less than a preselected number of breakdowns, this selected value then being utilized as a control parameter in the manufacturer of other capacitors.

---

Figure 1:
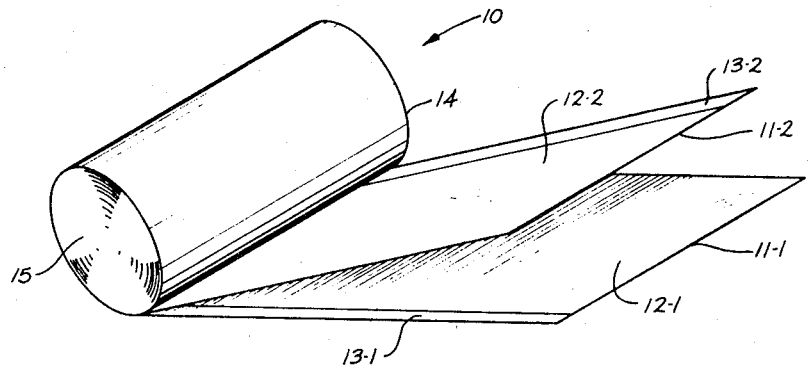

This invention relates to a method of establishing a testing procedure for self-healing capacitors and, more particularly, to such a method to be employed after the initial winding of these capacitors to determine which of them should be fabricated fully. It is an object of this invention to provide an improved method of such character.

As is well known in the art, a self-healing capacitor is formed by winding at least two metallized webs of dielectric material into a capacitor body in such a relationship that the metallized area of each web is separated from the metallized area of the other web by a thickness of dielectric material. Such a capacitor is described as being self-healing because, after complete fabrication of the capacitor, a high voltage applied to the capacitor will tend to burn away areas of metallization which interconnect the opposed electrodes and thereby establish minor short circuits therebetween. After such areas of metallization are burned out, the capacitor is said to be healed for it may thereafter be recharged to substantially full capacity.

Although a self-healing capacitor may have many shorted areas thereof burned out by placing a relatively high potential across it, an increase in the number of such short circuits, commonly known as breakdowns, which occur in a particular capacitor reduces the life expectancy thereof under normal use conditions. Therefore, it would be very desirable if the number of breakdowns could be controlled or at least ascertained to be less than a predetermined number of acceptable breakdowns before the capacitors are completely fabricated and subjected to a high voltage test.

In past practice, capacitors of the self-healing type have been fabricated at least to the point where the ends thereof have been solder sprayed and more often to the point of making the capacitors substantially resistant to the penetration of moisture therein. The individual capacitors then have a high voltage placed across the electrodes thereof during a high voltage breakdown test such that the short circulated areas of each of the capacitors may be healed by being burned out. During the time in which the sealing of an individual capacitor is effected, prior art circuits have been utilized to count the number of breakdowns occurring in the individual capacitor. In prior art practice, those individual capacitors were discarded which had more than a predetermined number of breakdowns occurring therein during the high voltage test.

Thus, in prior art practice there was no way of predicting at an initial step in the fabrication of self-healing capacitors which of such capacitors would have more than a predetermined number of breakdowns occurring therein when a high voltage was applied individually to such capacitors. Thus, both considerable time and expense were incurred in having to process all capacitors through the various steps of fabrication, at least to the step where such capacitors have the ends thereof solder sprayed and more often to the step where they were substantially resistant to the penetration of moisture therein, before the defective capacitors could be detected by a high voltage breakdown test performed individually on all of the capacitors.

Accordingly, it is another object of this invention to provide a method of establishing a testing procedure for self-healing capacitors which may be employed at an initial step in the fabrication thereof and which will indicate which of such partially fabricated capacitors may be immediately discarded since upon complete fabrication thereof they would have more than a predetermined number of breakdowns occurring therein.

It is still another object of this invention to provide a method of establishing a testing procedure for self-healing capacitors which may be employed at an initial step in the fabrication thereof and which eliminates the necessity of expending both unnecessary time and additional expense in certain fabrication steps on particular ones of such capacitors only to have these particular capacitors discarded on the basis of a high voltage breakdown test which indicates that more than a preselected number of breakdowns have occurred in the particular capacitors.

It is a further object of this invention to provide a method of establishing a testing procedure for self-healing capacitors which insures that fabrication steps beyond the initial winding of such capacitors will be applied only to those capacitors which will be most likely to have less than a predetermined number of breakdowns occurring therein when subjected to a high voltage breakdown test.

It is a still further object of this invention to provide a method of establishing a testing procedure for self-healing capacitors to be employed after the initial winding thereof to determine which of such capacitors should be fabricated fully, which method is simple in operation, easy to utilize and introduces a significant cost savings into the fabrication of such capacitors.

In accordance with the invention, the present method consists of the following steps: The internal resistance value representative of each of a plurality of self-healing capacitors measured after the winding thereof is correlated with a representative number of breakdowns occuring in each of the plurality of capacitors during a high voltage breakdown test performed on each of the capacitors after completing the fabrication thereof, so as to establish a relationship therebetween. An internal resistance value, above which the established relationship shows that the fully fabricated capacitors have less than a preselected number of breakdowns, is then statistically selected. The selected internal resistance value is thereafter utilized as a control parameter in the manufacture of other like capacitors.

Preferably, the control parameter may be utilized in the manufacturer of other like capacitors by comparing the internal resistance of each of said other capacitors after they are wound with the selected value. Thereafter, only those of said other capacitors which have an internal resistance value equal to or greater than the selected internal resistance value are fabricated completely. However, the selected internal resistance value may be utilized as a control parameter in the manufacture of other like capacitors in different manners which are more fully described herein.

Figure 2:
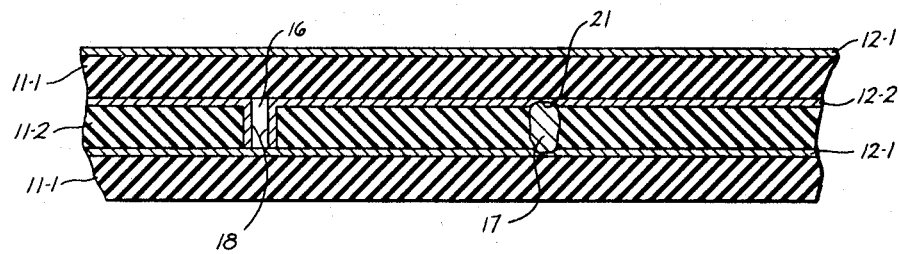
Figure 3:
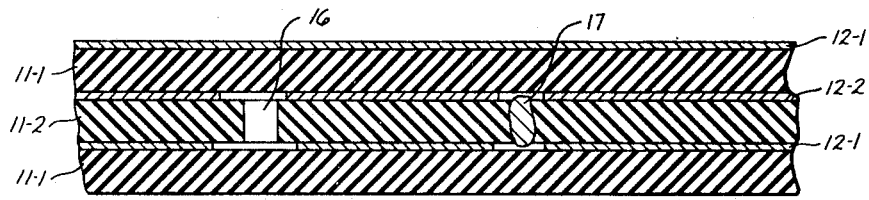

This invention, together with further objects and advantages thereof will best be understood by reference to the following description taken in conjunction with the accompanying drawings, in which:

FIG. 1 is an isometric view showing a self-healing capacitor after the winding thereof;

FIG. 2 is an enlarged, fragmentary view in cross section of three layers of dielectric material having metallized coatings thereon, which coatings form the electrodes of the self-healing type capacitor, and illustrates, in detail, two of the major types of faults which may result in small short circuits in such a capacitor; and FIG. 3 illustrates the dielectric webs shown in FIG. 2 after a high voltage has been applied to the capacitor to burn out, and thereby heal the short circuit areas.

With particular reference now to FIG. 1, there is shown a self-healing capacitor body 10 after it has been wound from a pair of dielectric webs 11–1 and 11–2 by any suitable winding apparatus. Each of the webs has an associated area of metallization 12–1 and 12–2 thereon. The capacitor body 10, described in conjunction with the preferred method of this invention, is formed from dielectric webs of less than 0.001 inch in thickness made from plastic material sold under the trade name Mylar by the E. I. du Pont Company of Wilmington, Del. Also, the areas of metallization 12–1 and 12–2 are formed by vapor deposition of zinc to a thickness in the range of one to five millionths of an inches.

As is apparent from FIG. 1, the web 11–1 has an unmetallized edge portion 13–1 on one side thereof while the web 11–2 has an unmetallized edge portion 13–2 on the other side thereof. Such an arrangement allows electrical termination to the metallized portion 12–1 of the web 11–1 on the edge portion of that web opposite the unmetallized portion 13–1 thereof by means of a solder spray which covers the end 14 of the capacitor body 10. The solder spray also electrically connects a lead (not shown) to the end 14 of the capacitor body. Similarly, the electrical termination to the web 11–2 is made on the end 15 of the capacitor body 10.

With reference to FIG. 2, there is shown, in an enlarged view, a cross section of three layers of metallized dielectric material which make up only a portion of the total number of windings in the capacitor body 10. Since only two webs are utilized to wind the capacitor body 10, the three webs shown in FIG. 2 are identified as 11–1, 11–2 and 11–1 again. The two webs 11–1 each has associated therewith a different metallized area 12–1 which forms a capacitor electrode. In like fashion, the web 11–2 has associated therewith the metallized area 12–2.

FIG. 2 also depicts two of the most common faults which occur in the dielectric web material, which faults result in short circuits between the electrodes 12–1 and 12–2. For purposes of illustration, the two faults are shown in the web 11–2 and consist of either a minute pin hole fault, generally identified by the numeral 16, or a metallic inclusion fault, generally identified by the numeral 17.

Considering these faults in greater detail, during the metallization of the web 11–2, the pinhole fault 16 will have the interior surfaces of the resulting pinhole coated with a thin layer of metal 18, whereas the metallic inclusion fault 17 will have an upper surface 21 covered by the area of metallized zinc 12–2 associated with the web 11–2. Thus, when a dielectric web 11–2, exhibiting the faults depicted in FIG. 2, is wound into a self-sealing capacitor body 10, two short circuits are completed from the metallized area 12–2 to the metallized area 12–1. A first short circuit path is established at the pinhole fault 16 by contact of the metallization 18 with the metallized area 12–1 of the web 11–1 and with the metallized area 12–2 of the adjacent web 11–1 separated by the common dielectric web 11–2. A second short circuit path is established at the metallic inclusion fault 17 by contact of the metallic inclusion 17 with the metallized area 12–1 of the web 11–1 and with the metallized area 12–2 of the adjacent web 11–1 separated by the common dielectric web 11–2.

When a breakdown test voltage, that is, a voltage above 18 volts and more normally in the range of 600 volts, is applied to the capacitor body 10, the thin areas of metallization associated with the faults 16 and 17 are burned away, as depicted in FIG. 3. More specifically, the areas of metallization above and below the metallic fault 17 are burned out such that the metallic inclusion no longer provides a conductive path between the two adjacent web areas of metallization. In a similar manner, at the site of the pinhole fault 16, a portion of the metallized web areas 12–1 and 12–2 are burned away, as well as all of metallization 18, whereby the short circuit path between the two adjacent metallized web areas at this fault is removed.

As previously mentioned, capacitors of this type which have such short circuits may be effectively healed by burning out the short circuiting portions thereof at a high voltage. However, if more than a predetermined number of such burn outs or breakdowns occur in a particular capacitor, the capacitor, which being subjected to changing voltages during normal use thereafter would not have the life expectancy which it would have had if the number of breakdowns occurring therein was below a preselected value.

Thus, in past practice, in order to produce capacitors having at least a normal life expectancy, the capacitors of this type were fabricated at least to the point where they were wound and had the ends thereof solder sprayed such that leads could be attached thereto. More often such capacitors were also dried in a suitable vacuum environment so as to remove moisture therefrom, and were wax impregntaed so that the capacitors were substantially resistant to the penetration of moisture therein.

It was necessary to fabricate such capacitors at least to the point where the ends thereof were solder sprayed so that electrical contact could be made with the electrodes thereof for a high voltage breakdown test. If the capacitors are not solder sprayed, the electrodes of the capacitors tend to burn away in the areas where the probes for the breakdown tests are connected thereto.

In prior art practice, after the capacitors were fabricated, at least to the point where the ends thereof were solder sprayed, they were subjected individually to a high voltage breakdown test, wherein the number of breakdowns occurring therein were counted. A circuit for performing this function is disclosed in U.S. Patent No. 3,048,774, issued to H. R. Shillington on Aug. 7, 1962. As a result of this testing procedure, those capacitors which had more than a preselected number of breakdowns, such as three, were discarded since they would have less than a normal life expectancy in an operating environment.

Thus, in prior art practice, self-healing capacitors had to be fabricated at least to the point of having the ends thereof solder sprayed and more often to the point of being substantially resistant to the penetration of moisture therein before being examined for rejects utilizing a high voltage breakdown test.

By utilization of the method of the present invention, a capacitor may be rejected during an early stage of fabrication as being one which would, if completely fabricated, have more than a preselected number of breakdowns occurring therein when subjected to a high voltage breakdown test. This is accomplished by employing a simple testing procedure immediately after the winding of the capacitor rather than after such capacitors are fabricated to the point of having their ends solder sprayed or more often to the point of being substantially resistant to the penetration of moisture therein as required by prior methods.

In accordance with the principles of this invention, a testing procedure is established by initially winding a plurality of test capacitors of the self-healing type. After the winding of these capacitors, a measurement of the internal resistance of each capacitor is preferably made at a voltage less than 18 volts, and the results of such measurements are recorded. Thereafter, the test capacitors are subjected to further fabricating operations at least up to the point where the ends thereof are solder sprayed. At this point, each of the plurality of test capacitors is subjected individually to a high voltage breakdown test typically utilizing a voltage between 200 and 600 volts, and the number of breakdowns occurring in each individual capacitor is counted by a circuit such as described in the aforementioned Shillington patent.

The results of the internal resistance measurements and breakdown test measurements are respectively arranged to obtain a value for each measurement which is representative of each of the plurality of test capacitors. These statistically determined representative values are then correlated and the functional interrelationship therebetween noted. As an example of the interrelationship of resistance and breakdowns, when the above described type of metallized Mylar capacitor was produced so as to have a capacitance value of 0.50 $\mu$f., it was found that if the internal resistance of a capacitor measured after the winding thereof was above 100,000 ohms, then the capacitor would generally have no more than three breakdowns occurring therein when the capacitor was subjected to a high voltage breakdown test after the fabrication thereof to the point where the ends thereof were solder sprayed.

After a correlation of the resistance and breakdown tests is made, a control parameter, based on a selected internal resistance value, is established for utilization in the fabrication of other self-healing capacitors. For example, if it is desired to produce 0.50 $\mu$f. capacitors of the metallized Mylar type which exhibit three or less breakdowns therein at a predetermined high voltage, then an internal resistance value of 100,000 ohms is selected and utilized as the control parameter in the fabrication of other like capacitors. However, if it is desired to produce capacitors having more or less numbers of breakdowns occurring therein, an associated resistance value is selected from the correlated data so as to establish the proper control parameter for utilization in the fabrication of subsequent capacitors of the same type.

In accordance with the preferred embodiment of this invention the control parameter of 100,000 ohms may be utilized in many different ways in the fabrication of other like metallized Mylar capacitors having a final capacitance value of 0.50 $\mu$f.

In a first way of utilizing the selected internal resistance as a control parameter in the manufacture of self-healing capacitors, each of the wound capacitors has its initial internal resistance value measured immediately after the winding thereof. If the resistance value of the particular capacitor is below the selected value, that is, 100,000 ohms, the particular capacitor is rejected immediately. The rejection of the capacitor after the winding thereof saves both time and expense in comparison with prior art methods wherein the capacitor would have been processed through at least one but more often through several additional fabrication steps before the rejection thereof on the basis of a high voltage breakdown test.

In a second way of utilizing the control parameter, a selected number of samples are taken from successive groups of capacitors after the winding thereof. For example, five capacitors might be selected from a group of one hundred wound capacitors. In this case, if each of the five capacitors have an internal resistance value greater than the selected value designated as the control parameter, the entire group of capacitors are then processed through the other steps in the fabrication procedure. However, if any of the selected sample capacitors have an internal resistance below the selected value, the whole group of capacitors is rejected or, in the alternative, each capacitor in the group has its internal resistance value measured.

Still another way of utilizing the selected internal resistance value as a control parameter in the fabrication of self-healing capacitors may take a form wherein the internal resistance of each capacitor is tested against the selected control parameter immediately after the winding of the capacitor. When a capacitor has an internal resistance below the control parameter, that particular capacitor, as well as a preselected portion of the webs immediately adjacent those portions of the webs from which the capacitor was wound, are discarded. Such use of the selected internal resistance value as a control parameter is based on the assumption that the dielectric material and/or the metallization of the particular webs from which the capacitor was wound is defective, at least along a portion of such webs. The portion of the webs to be discarded when such a defective capacitor is found may vary from a few feet to the entire length of web depending upon the number and frequency of occurrence of defective capacitors wound from such webs.

Thus, there has been disclosed herein a method of establishing a testing procedure for self-healing capacitors, which method establishes a control parameter against which other capacitors are checked immediately after the winding thereof. If a measured internal resistance of the capacitor falls below the control parameter, namely, a statistically determined value of resistance correlated to sampled capacitor breakdowns, the capacitor is immediately discarded as being one which, if completely fabricated, would fail a high voltage breakdown test subsequently applied thereto. By utilization of this control parameter, in one of the several ways outlined above, or in other ways to suit the particular manufacturing situation, capacitors are rejected at an earlier stage in their fabrication than is possible with prior art methods whereby substantial time and expense saving are realized.

While an embodiment of the method of this invention has been disclosed herein, many modifications thereof will be apparent to one skilled in the art. It is intended that all such modifications which fall within the true spirit of this invention be interpreted as included within the scope thereof.

What is claimed is:

1. A method of establishing a testing procedure for self-healing capacitors to be employed after the winding thereof to determine which of such capacitors should be fabricated fully, which method comprises the steps of:

measuring individually the internal resistance of a plurality of self-healing capacitors after the winding thereof so as to determine a representative resistance value thereof;

completing the fabrication of the plurality of capacitors at least to the point where the ends of the capacitors are solder sprayed;

applying a high voltage breakdown test to each of the plurality of capacitors to determine a representative number of breakdowns therein;

correlating the representative internal resistance value and the representative number of breakdowns in the tested capacitors so as to establish a relationship therebetween;

selecting an internal resistance value above which the established relationship shows that the fully fabricated capacitors have less than a preselected number of breakdowns; and thereafter utilizing the selected internal resistance value as a control parameter in the manufacture of other capacitors.

2. A method of establishing a testing procedure for self-healing capacitors as defined in claim 1 wherein the selected internal resistance value is utilized as a control parameter in the manufacture of other like capacitors by comparing the internal resistance of each of said other capacitors after they are wound with the selected value and thereafter completing fabrication of only those of said other capacitors which have an internal resistance value equal to or greater than the selected internal resistance value.

3. The method of establishing a testing procedure for self-healing capacitors as defined in claim 1 wherein the selected internal resistance value is utilized as a control parameter in the manufacture of other like capacitors by comparing the internal resistance of sample capacitors selected from successive groups of said other capacitors with the selected value, and completing fabrication of only those groups of said other capacitors in which all of the sample capacitors have an internal resistance value equal to or greater than the selected internal resistance value.

4. The method of establishing a testing procedure for self-healing capacitors as defined in claim 1 wherein the selected resistance value is utilized as a control parameter in the manufacture of other like capacitors by comparing the internal resistance of each of said other capacitors with the selected value immediately after the winding of each capacitor and, when the internal resistance of one of said other capacitors is less than the selected value, discarding both said one capacitor and any defective portion of the material adjacent that portion of the material from which said one capacitor was wound.

5. A method of establishing a testing procedure for wound capacitors to be employed after the winding thereof from metallized webs of dielectric material to determine which of such capacitors should be fabricated fully, which comprises the steps of:

measuring individually the internal resistance of a plurality of wound capacitors after the winding thereof so as to determine a representative resistance value thereof;

completing the fabrication of the plurality of capacitors at least to the point where the ends of the capacitors are solder sprayed;

applying a high voltage breakdown test to each of the plurality of capacitors to determine a representative number of breakdowns therein;

correlating the representative internal resistance value and the representative number of breakdowns in the tested capacitors so as to establish a relationship therebetween;

selecting an internal resistance value above which the established relationship shows that the fully fabricated capacitors have less than a predetermined number of breakdowns;

thereafter measuring individually the internal resistance of other like capacitors immediately after the winding of each of said other capacitors;

completing the fabrication of said other capacitors which have an internal resistance value equal to or greater than the selected value; and when the internal resistance of one of said other capacitors is less than the selected internal resistance value, discarding both said one capacitor and any defective portions of the metallized webs adjacent portions of the metallized webs from which said one capacitor was wound.

References Cited

UNITED STATES PATENTS

| 2,925,553 | 2/1960 | Shillington | 324—60 XR |
| 2,992,730 | 7/1961 | Rayburn et al. | 324—60 XR |
| 3,284,684 | 11/1966 | Gaenge | 29—25.42 XR |

JOHN F. CAMPBELL, Primary Examiner

R. B. LAZARUS, Assistant Examiner

U.S. Cl. X.R.

29—407, 593; 324—60